(12) United States Patent
Maier (10) Patent No.: US 8,283,825 B2
(45) Date of Patent: Oct. 9, 2012

(54) AUXILIARY BEARING SYSTEM WITH PLURALITY OF INERTIA RINGS FOR MAGNETICALLY SUPPORTED ROTOR SYSTEM

(75) Inventor: William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 133 days.

(21) Appl. No.: 12/900,648

(22) Filed: Oct. 8, 2010

(65) Prior Publication Data

US 2011/0084563 A1 Apr. 14, 2011

Related U.S. Application Data

(60) Provisional application No. 61/250,307, filed on Oct. 9, 2009.

(51) Int. Cl.
*F16C 32/04* (2006.01)
*F16C 32/00* (2006.01)
*H02K 7/09* (2006.01)

(52) U.S. Cl. ......... 310/90.5; 310/90; 384/101; 384/102; 384/624

(58) Field of Classification Search .............. 310/90, 310/90.5; 384/101, 102, 624
See application file for complete search history.

(56) References Cited

U.S. PATENT DOCUMENTS

| | | |
|---|---|---|
| 2,231,323 A | 2/1941 | Cawood |
| 3,295,801 A | 1/1967 | McDowall et al. |
| 3,630,586 A | 12/1971 | Pitner |
| 3,683,734 A | 8/1972 | Claussen |
| 3,827,337 A | 8/1974 | Pruvot |
| 3,947,153 A | 3/1976 | Matthias et al. |
| 4,063,786 A | 12/1977 | Rall |
| 4,128,280 A | 12/1978 | Purtschert |
| 4,141,604 A | 2/1979 | Haberman et al. |
| 4,213,661 A | 7/1980 | Marmol |
| 4,460,283 A | 7/1984 | Yoshioka et al. |
| 4,526,483 A | 7/1985 | Hishikawa et al. |
| 4,542,994 A | 9/1985 | Mohsin |
| 4,545,586 A | 10/1985 | Von Pragenau |
| 4,553,855 A | 11/1985 | De Choudhury |
| 4,597,676 A | 7/1986 | Vohr et al. |

(Continued)

FOREIGN PATENT DOCUMENTS

JP 08-082397 A 3/1996

(Continued)

OTHER PUBLICATIONS

Tecza and Walton, "A Chambered Porous Damper for Rotor Vibration Control: Part I—Concept Development" in The American Society of Mechanical Engineers, NY, 7 pages.

(Continued)

*Primary Examiner* — Quyen Leung
*Assistant Examiner* — David Scheuerman
(74) *Attorney, Agent, or Firm* — Edmonds & Nolte, PC (57) ABSTRACT

An auxiliary bearing system for supporting a rotating shaft including a first auxiliary bearing coupled to the rotating shaft. A first inertia ring is coupled to and circumscribes the first auxiliary bearing. A second inertia ring circumscribes the first inertia ring. A radial clearance is defined between the first and second inertia rings when the rotating shaft is supported by a primary bearing system, and the first inertia ring engages the second inertia ring when the rotating shaft is not supported by the primary bearing system. A second auxiliary bearing is engaged with an outer surface of the second inertia ring.

19 Claims, 4 Drawing Sheets

U.S. PATENT DOCUMENTS

| | | | |
|---|---|---|---|
| 4,657,414 A | 4/1987 | Stella |
| 4,683,111 A | 7/1987 | Helm et al. |
| 4,827,169 A | 5/1989 | Habermann |
| 4,872,767 A | 10/1989 | Knapp |
| 4,929,158 A | 5/1990 | Girault |
| 4,982,126 A | 1/1991 | Jolivet et al. |
| 5,021,697 A | 6/1991 | Kralick |
| 5,083,053 A | 1/1992 | New |
| 5,126,612 A | 6/1992 | Girault |
| 5,231,323 A | 7/1993 | New |
| 5,272,403 A | 12/1993 | New |
| 5,341,527 A | 8/1994 | Schmidt et al. |
| 5,347,190 A | 9/1994 | Lewis et al. |
| 5,355,040 A | 10/1994 | New |
| 5,425,584 A | 6/1995 | Ide |
| 5,521,448 A | 5/1996 | Tecza et al. |
| 5,547,287 A | 8/1996 | Zeidan |
| 5,616,976 A | 4/1997 | Fremerey et al. |
| 5,630,881 A | 5/1997 | Ogure et al. |
| 5,693,994 A | 12/1997 | New |
| 5,714,818 A | 2/1998 | Eakman et al. |
| 5,749,700 A | 5/1998 | Henry et al. |
| 5,752,774 A | 5/1998 | Heshmat et al. |
| 5,803,612 A | 9/1998 | Battig |
| 5,810,485 A | 9/1998 | Dublin, Jr. et al. |
| 5,977,677 A | 11/1999 | Henry et al. |
| 6,036,435 A | 3/2000 | Oklejas |
| 6,078,120 A | 6/2000 | Casaro et al. |
| 6,155,720 A | 12/2000 | Battig |
| 6,194,801 B1 | 2/2001 | Goransson |
| 6,196,809 B1 | 3/2001 | Takahashi et al. |
| 6,244,749 B1 | 6/2001 | Nakagawa et al. |
| 6,309,174 B1 | 10/2001 | Oklejas, Jr. et al. |
| 6,310,414 B1 | 10/2001 | Agahi et al. |
| 6,353,273 B1 | 3/2002 | Heshmat et al. |
| 6,402,385 B1 | 6/2002 | Hayakawa et al. |
| 6,770,993 B1 | 8/2004 | Heshmat et al. |
| 6,846,158 B2 | 1/2005 | Hull |
| 6,987,339 B2 | 1/2006 | Adams et al. |
| 7,240,583 B2 | 7/2007 | Wingett et al. |
| 7,264,430 B2 | 9/2007 | Bischof et al. |
| 7,367,713 B2 | 5/2008 | Swann et al. |
| 7,429,811 B2 | 9/2008 | Palazzolo et al. |
| 7,694,540 B2 | 4/2010 | Ishida et al. |
| 7,836,601 B2 | 11/2010 | El-Shafei |
| 2004/0047526 A1 | 3/2004 | Dewachter et al. |
| 2004/0189124 A1 | 9/2004 | Baudelocque et al. |
| 2006/0204153 A1 | 9/2006 | Alam et al. |
| 2007/0036476 A1 | 2/2007 | Lane et al. |
| 2009/0302698 A1 | 12/2009 | Menz et al. |
| 2010/0021095 A1 | 1/2010 | Maier |
| 2011/0052109 A1 | 3/2011 | Tecza et al. |

FOREIGN PATENT DOCUMENTS

| | | |
|---|---|---|
| JP | 2001-124062 A | 5/2001 |
| KR | 10-1989-0010437 A | 8/1989 |
| KR | 10-0207986 B1 | 7/1999 |
| WO | 91-17367 | 11/1991 |
| WO | 01-57408 A1 | 8/2001 |
| WO | 2006-098806 A1 | 9/2006 |
| WO | 2007-047976 A1 | 4/2007 |
| WO | 2011-044423 A1 | 4/2011 |
| WO | 2011-044428 A1 | 4/2011 |
| WO | 2011-044430 A1 | 4/2011 |
| WO | 2011-044432 A1 | 4/2011 |
| WO | 2011-020746 A1 | 7/2011 |

OTHER PUBLICATIONS

Walton and Martin, "A Chambered Porous Damper for Rotor Vibration Control: Part II—Imbalance Response and Bladeloss Simulation" in The American Society of Mechanical Engineers, NY, 7 pages.

PCT/US2010/051922 International Search Report and Written Opinion dated Jun. 30, 2011 (8 pages).

PCT/US2010/051927 International Search Report and Written Opinion dated Jun. 30, 2011 (8 pages).

Tecza and Walton, "A Chambered Porous Damper for Rotor Vibration Control: Part I—Concept Development" in The American Society of Mechanical Engineers, NY, 7 pages, (dated 1991).

Walton and Martin, "A Chambered Porous Damper for Rotor Vibration Control: Part II—Imbalance Response and Bladeloss Simulation" in The American Society of Mechanical Engineers, NY, 7 pages, (dated 1991).

PCT/US2010/051930 International Search Report and Written Opinion dated Jun. 30, 2011 (8 pages).

PCT/US2010/051932 International Search Report and Written Opinion dated Jun. 30, 2011 (8 pages).

PCT/US2010/020746 International Search Report and Written Opinion dated Sep. 23, 2011 (8 pages).

"Auxiliary Bearings in Vertically Oriented Machines on Magnetic Bearings," EPRI, Palo Alto, CA: 2001. 1003177.

Extended European search report for EP 06817242.8 dated Aug. 7, 2009, 3 pages.

Supplementary European search report for EP 06817242.8 dated Aug. 25, 2009, 1 page.

International Preliminary Report on Patentability for PCT/US2006/041127 dated Apr. 23, 2008, 4 pages.

Written Opinion of the International Searching Authority for PCT/US2006/041127 dated Mar. 19, 2007, 3 pages.

AUXILIARY BEARING SYSTEM WITH PLURALITY OF INERTIA RINGS FOR MAGNETICALLY SUPPORTED ROTOR SYSTEM

CROSS REFERENCE TO RELATED APPLICATIONS

This application claims priority to U.S. Patent Application Ser. No. 61/250,307, which was filed Oct. 9, 2009. This priority application is hereby incorporated by reference in its entirety into the present application, to the extent that it is consistent with the present application.

BACKGROUND

In turbomachine systems without an auxiliary bearing, if a primary bearing (such as a magnetic bearing) fails, the shaft of the turbomachine will drop onto the adjacent mechanical components. This drop will cause substantial damage to the shaft and/or the surrounding components. In turbomachine systems that include an auxiliary bearing, also known as a "coast down bearing" or a "catcher bearing," the auxiliary bearing will support the shaft in a stable position after failure of a primary bearing and allow for the safe coast down of the shaft.

In a typical arrangement, while a shaft is levitated by primary magnetic bearings during normal operation, the shaft does not contact the auxiliary bearing. When levitation by the primary magnetic bearings is lost, the shaft drops onto the auxiliary bearing. However, problems may arise during the operation of a typical auxiliary bearing arrangement. For example, the shaft may drop onto friction pads mounted on the auxiliary bearings. These friction pads may not stabilize the rotor adequately during coast down, especially if the shaft applies gravitational and rotational forces on a single pad (as opposed to between two or more pads). Moreover, when a drop of the shaft occurs, the auxiliary bearing is accelerated instantaneously to the shaft rotation speed. This configuration subjects the components of the auxiliary bearing to extreme accelerations, which have been shown to cause backward whirl of the shaft, brinelling of bearing races, skidding between bearing rolling elements and races, high stresses in the bearing housing, and overheating of the bearing. Therefore, the operating life of auxiliary bearings in these typical configurations is typically only a few drops of the shaft.

Further complicating the matter, magnetic bearings are now being considered for applications where the auxiliary bearings must repeatedly control deceleration of the shaft while minimizing damage to auxiliary bearing components. The lack of a reliable, long-lasting, auxiliary bearing technology has been a barrier to the implementation of magnetic bearings in certain turbomachines. Thus, there is a need for an auxiliary bearing system that can tolerate numerous drops of a shaft.

SUMMARY

Embodiments of the disclosure may provide an auxiliary bearing system for supporting a rotating shaft. A first auxiliary bearing may be coupled to the rotating shaft. A first inertia ring may be coupled to and circumscribe the first auxiliary bearing. A second inertia ring may circumscribe the first inertia ring, and a radial clearance may be defined between the first and second inertia rings when the rotating shaft is supported by a primary bearing system, and the first inertia ring may engage the second inertia ring when the rotating shaft is not supported by the primary bearing system. A second auxiliary bearing may be engaged with an outer surface of the second inertia ring.

Embodiments of the disclosure may further provide a method for supporting a rotating shaft. The method may include coupling a first auxiliary bearing to the rotating shaft, wherein the rotating shaft is normally supported by a primary bearing system. The method may also include coupling a first inertia ring to the first auxiliary bearing. The method may further include extending a second inertia ring circumferentially around the first inertia ring, wherein a radial clearance is defined between the first and second inertia rings when the rotating shaft is supported by the primary bearing system, and wherein the first inertia ring engages the second inertia ring when the rotating shaft is not supported by the primary bearing system. The method may further include engaging a second auxiliary bearing with the second inertia ring. The method may further include supporting the rotating shaft with the first auxiliary bearing and the second auxiliary bearing when the primary bearing system fails to maintain the rotating shaft in a magnetically levitated position.

Embodiments of the disclosure may further provide a rotor system that includes a rotating shaft. A magnetic bearing system may be positioned to support the shaft during normal operation. An auxiliary bearing system may be positioned along the shaft and include a first inertia ring rotating with the shaft during normal operation and a second inertia ring circumscribing the first inertia ring and not rotating during normal operation. The auxiliary bearing system may be configured to support the shaft when the magnetic bearing system fails to support the shaft.

Embodiments of the disclosure may further provide a method for supporting a rotating shaft including engaging an inner inertia ring with a friction pad when a magnetic bearing system cannot support the rotating shaft, the inner inertia ring being coupled to and circumscribing a first auxiliary bearing, and the first auxiliary bearing being coupled to and circumscribing the rotating shaft. The method may also include rotating the friction pad and an outer inertia ring coupled to and circumscribing the friction pad in response to the engagement between the inner inertia ring and the friction pad. The method may further include rotating an outer bearing ring of a second auxiliary bearing in response to the rotation of the outer inertia ring, the outer bearing ring being tangentially engaged with an outer surface of the outer inertia ring.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope.

Figure 1:
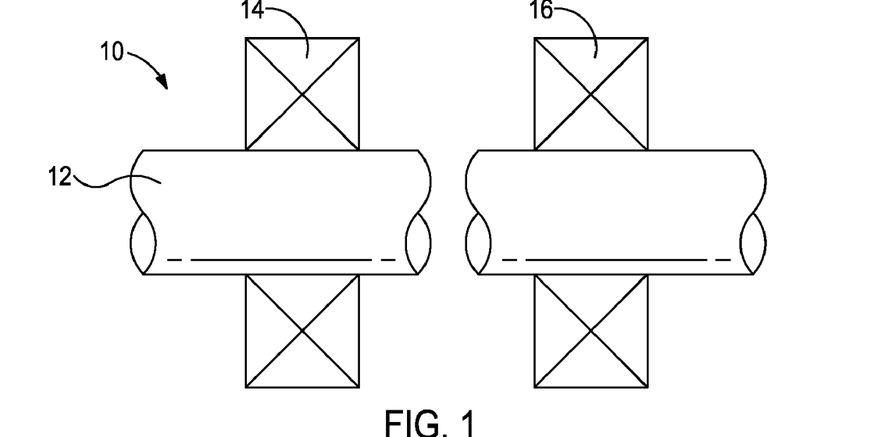
FIG. 1 is a diagrammatic view of a rotor system according to an exemplary embodiment.

In an exemplary embodiment, as illustrated in FIG. 1, a rotor system is generally referred to by the reference numeral 10 and includes a shaft 12 and a magnetic bearing system 14, which may be one of a plurality of magnetic bearing systems that normally support the shaft 12 and are positioned at axially-spaced locations along the shaft 12. The rotor system 10 further includes an auxiliary bearing system 16, which may be one of a plurality of auxiliary bearing systems that are positioned at axially-spaced locations along the shaft 12. The auxiliary bearing system 16 supports the shaft 12 when the magnetic bearing system 14 fails. In several exemplary embodiments, the auxiliary bearing system 16 is an auxiliary bearing system 100, as described below and illustrated in FIGS. 2 and 3. In several exemplary embodiments, the rotor system 10 includes, or is part of, a turbomachine such as, for example, a turbine, motor, generator, compressor such as a rotary compressor, or any other rotating equipment assembly, including a turboset.

Figure 2:
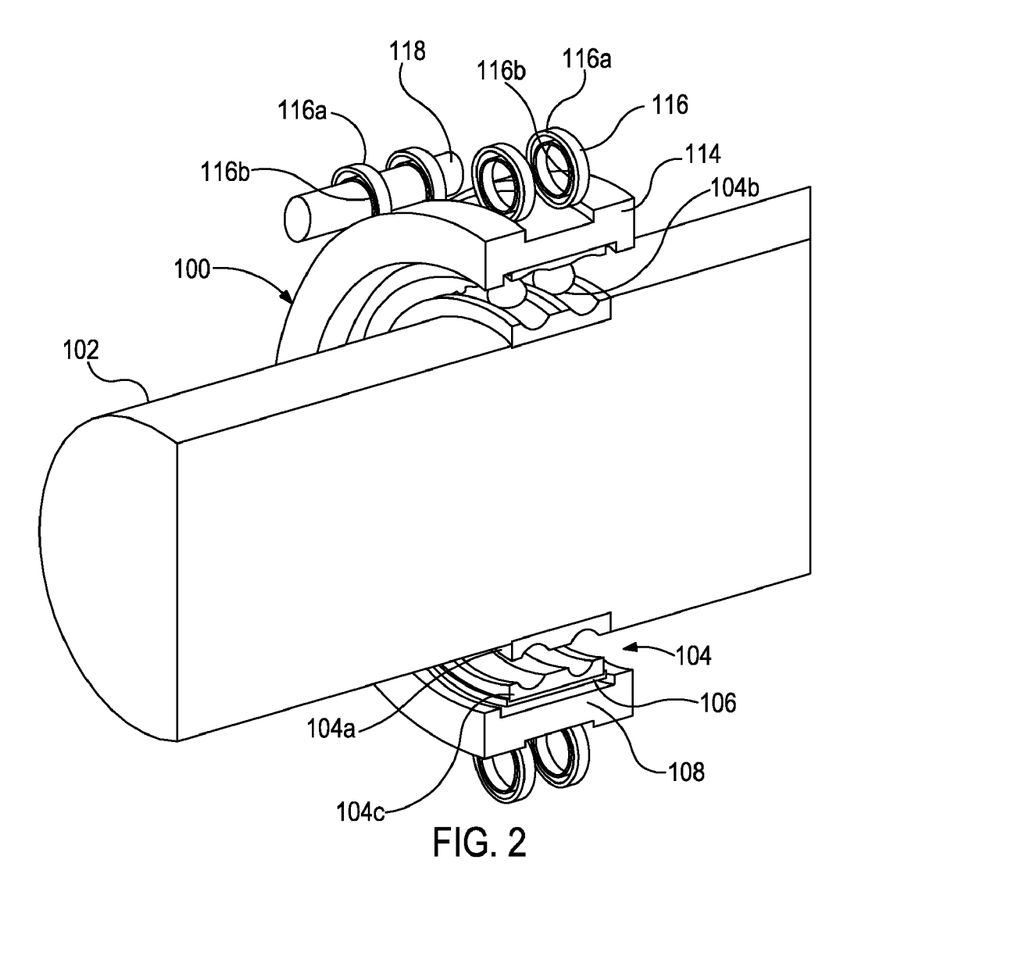
FIG. 2 is a perspective view of a section of a rotor system according to an exemplary embodiment, the rotor system including a shaft and an auxiliary bearing system.
Figure 3:
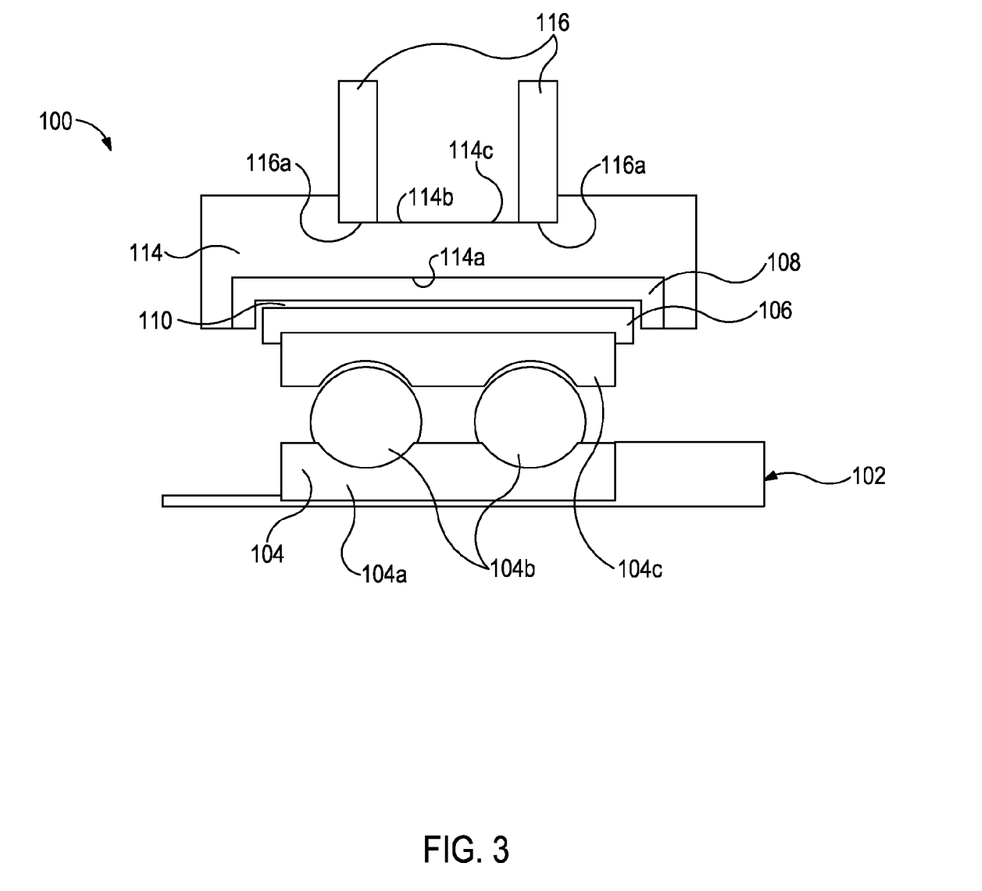
FIG. 3 is a sectional view of a portion of the auxiliary bearing system of FIG. 2 according to an exemplary embodiment.

In an exemplary embodiment, as illustrated in FIGS. 2 and 3 with continuing reference to FIG. 1, an auxiliary bearing system is generally referred to by the reference number 100. The auxiliary bearing system 100 extends circumferentially around a shaft 102. The auxiliary bearing system 100 includes a primary auxiliary bearing 104 that receives and is coupled to the shaft 102. As best shown in FIG. 3, the primary auxiliary bearing 104 includes an inner annular race 104a that receives the shaft 102, and a plurality of rolling elements 104b disposed circumferentially around the inner annular race 104a (several of the rolling elements 104b are not shown in FIG. 2). The primary auxiliary bearing 104 further includes an outer annular race 104c that extends circumferentially around the rolling elements 104b. In an exemplary embodiment, the rolling elements 104b are a set of angular contact rolling elements that are preloaded against each other by pressing the rolling elements 104b against one another as they are mounted between the races 104a and 104c. The components of the primary auxiliary bearing 104 are tightly mounted and preloaded, thus avoiding deleterious ball-race impacts and slippage, both during normal operation of the shaft 102 and after a drop of the shaft 102.

The primary auxiliary bearing 104 is coupled to an inner inertia ring 106, which circumscribes the primary auxiliary bearing 104 and folds over the axial ends thereof. The inner inertia ring 106 is located radially inside and opposite one or more friction pads 108. The friction pads 108 may be a continuous annular piece or multiple circumferential segments. In several exemplary embodiments, the friction pads 108 are multiple circumferential segments, which are configured to facilitate minimizing shape distortion of the friction pads 108 due to heat generation after a drop of the shaft 102. More particularly, in an exemplary embodiment, the friction pads 108 have a low coefficient of thermal expansion, and the limited thermal expansion of the friction pads 108 does not cause contact with nearby pads or other mechanical components, thereby minimizing shape distortion. In an exemplary embodiment, the friction pads 108 are made of a material with a durable surface, such as a para-aramid synthetic fiber. In another exemplary embodiment, the friction pads 108 include a sacrificial friction material. In yet another exemplary embodiment, the friction pads 108 include materials such as clutch material, brake material, sintered material, and/or any combination thereof.

In yet another exemplary embodiment, the friction pads 108 include a relatively hard coating, such as chrome oxide or titanium nitride. In an exemplary embodiment, the outer surface of the inner inertia ring 106 is composed of a material that provides a beneficial tribologic pair with the material of the friction pads 108, such that mechanical wear on the inner inertia ring 106 and on the friction pads 108 is minimized. For example, the outer surface of the inner inertia ring 106 may be made of cast iron or steel, and the friction pads 108 may be made of Kevlar fiber, thereby facilitating smooth engagement of the inner inertia ring 106 with the friction pads 108 after a drop of the shaft 102, and minimizing wear on the surfaces thereof.

A radial clearance 110 is defined between the outer surface of the inner inertia ring 106 and the friction pads 108, as best shown in FIG. 3. The friction pads 108 are mounted in an inner annular channel 114a formed in the inside surface of an outer inertia ring 114, which circumscribes the friction pads 108, the inner inertia ring 106, the primary auxiliary bearing 104, and the shaft 102. The outer inertia ring 114 is rotatably mounted with a plurality of secondary auxiliary bearings 116 (described below) or otherwise configured so that the outer inertia ring 114, and thus the friction pads 108, are permitted to rotate freely in place. The friction pads 108 are mounted to the outer inertia ring 114 by a suitable fastening system with, for example, screws, clamps, adhesive bonding, or brazing. Because the friction pads 108 are physically supported in the radial direction by the outer inertia ring 114, the amount of radial stress that the fastening system bears is relatively small.

The outer inertia ring 114 is engaged with the plurality of circumferentially spaced secondary auxiliary bearings 116, each of which includes an outer ring 116a that tangentially engages an outside surface 114b defined by an outer annular channel 114c formed in the outer inertia ring 114, an inner ring 116b around which the outer ring 116a extends circumferentially, and rolling elements (not shown) disposed between the rings 116a and 116b, which rolling elements are preloaded. As shown in FIGS. 2 and 3, the secondary auxiliary bearings 116 include at least two circumferential arrays of the rings 116a and 116b, each pair of the rings 116a and 116b containing multiple rolling elements. Each pair of the rings 116a and 116b are mounted so that at least the outer ring 116a is configured to rotate in response to the rotation of the outer inertia ring 114. For example, each of the inner rings 116b may extend circumferentially around, and be coupled to, a stationary shaft or rod 118 that is generally parallel to the shaft 102, which configuration permits the outer ring 116a to rotate relative to the inner ring 116b and the rod 118 in response to the rotation of the outer inertia ring 114. In an exemplary embodiment, each of the rods 118 may extend through, and be coupled to, the pair of axially aligned inner rings 116b in the circumferential arrays, as shown in FIG. 2, which illustrates such an extension of one of the rods 118 (the other rods are not shown). In an exemplary embodiment, instead of, or in addition to the secondary auxiliary bearings 116 including two circumferential arrays of the rings 116a and 116b as shown in FIGS. 2 and 3, the secondary auxiliary bearings 116 may include a set of concentric angular contact or deep groove ball bearings, which are tightly mounted and preloaded.

In an exemplary embodiment, with continuing reference to FIGS. 1-3, the auxiliary bearing system 100 and the shaft 102 are the auxiliary bearing system 16 and the shaft 12, respectively, of the rotor system 10, and the operation of the rotor system 10 will be described as such with reference to the auxiliary bearing system 100 and the shaft 102, as well as to the magnetic bearing system 14.

During the operation of the rotor system 10, the shaft 102 is normally supported in an operational position by the magnetic bearing system 14, which, in an exemplary embodiment, includes active magnetic bearings that have one or more electromagnets controlled by a magnet control. The magnet control may also be equipped with one or more sensors configured to monitor operating conditions of the magnetic bearing system. In another exemplary embodiment, the magnetic bearing system 14 may be a passive magnetic bearing that only includes permanent magnets.

The primary auxiliary bearing 104 is coupled to the shaft 102, and the inner inertia ring 106 is coupled to the primary auxiliary bearing 104, so that the primary auxiliary bearing 104 and the inner inertia ring 106 rotate along with the shaft 102 when the shaft 102 is normally supported by the magnetic bearing system 14. The shaft 102, the primary auxiliary bearing 104 and the inner inertia ring 106 rotate relative to the friction pads 108, the outer inertia ring 114, and the secondary auxiliary bearings 116, all of which are generally stationary.

When the magnetic bearing system 14 fails, the shaft 102 drops, after which the inner inertia ring 106 is forced into the clearance 110 and comes into contact with or otherwise engages the friction pads 108. This engagement begins to arrest the rotational and/or axial motion of the primary auxiliary bearing 104, which, in turn, begins to arrest the rotational and/or axial motion of the shaft 102. The coupling between the outer annular race 104c and the inner inertia ring 106 increases the total mass of the rotating assembly attached to the shaft 102, thereby slowing the rate of deceleration of the primary auxiliary bearing 104 after the drop of the shaft 102.

As a result of the engagement between the inner inertia ring 106 and the friction pads 108 in response to the drop of the shaft 102, a portion of the rotational and/or translational energy of the shaft 102 is converted into heat energy via friction between the inner inertia ring 106 and the friction pads 108, thereby regulating the slowdown of the inner inertia ring 106. This conversion helps prevent damage to, for example, the rolling elements 104b, due to sudden impacts or rapid deceleration, thereby allowing the primary auxiliary bearing 104 to tolerate a large number of drops. The configuration of the friction pads 108 also minimizes the tendency for the shaft 102 to backward whirl or to become unstable during coast down.

Since the friction pads 108 are coupled to the outer inertia ring 114, the engagement between the inner inertia ring 106 and the friction pads 108 causes the friction pads 108 to transfer one or more radial and/or axial forces from the inner inertia ring 106 to the outer inertia ring 114. The friction pads 108 and the outer inertia ring 114 begin to accelerate to an intermediate rotational speed that is less than the rotational speed of at least the inner inertia ring 106. Since the outer rings 116a of the secondary auxiliary bearings 116 are tangentially engaged with the outside surface 114b of the outer inertia ring 114, the rotation of the outer inertia ring 114 causes at least the respective outer rings 116a of the secondary auxiliary bearings 116 to begin to accelerate, thereby rotating while the respective inner rings 116b remain generally stationary. The acceleration of the secondary auxiliary bearings 116 is lessened because both the friction pads 108 and the outer inertia ring 114 are free to accelerate rotationally, increasing the total inertia of the components that are generally stationary prior to the drop of the shaft 102, namely the friction pads 108, the outer inertia ring 114 and the secondary auxiliary bearings 116.

As a result of the engagement between the inner inertia ring 106 and the friction pads 108 in response to the drop of the shaft 102, and the coupling of the friction pads 108 to the outer inertia ring 114, a portion of the rotational energy of the shaft 102 is converted into the rotational energy of the outer inertia ring 114, thereby regulating the coast down of the shaft 102 and preventing damage to the primary auxiliary bearing 104. This conversion helps prevent damage to, for example, the rolling elements 104b, due to sudden impacts or rapid deceleration, thereby allowing the primary auxiliary bearing 104 to tolerate a large number of drops.

In response to the drop of the shaft 102, the auxiliary bearing system 100 supports and absorbs thrust or axial loads or forces as a result of one or more of the following: the inner inertia ring 106 folding over the axial ends of the primary auxiliary bearing 104, the extension of the inner inertia ring 106 between facing portions of the friction pads 108 (FIG. 3), the mounting of the friction pads 108 in the inner annular channel 114a of the outer inertia ring 114, and the positioning of the secondary auxiliary bearings 116 in the outer annular channel 114c of the outer inertia ring 114. More particularly, the extension of the inner inertia ring 106 between facing portions of the friction pads 108 permits axial forces applied against the inner inertia ring 106 to be transferred from the inner inertia ring 106 to the friction pads 108 in at least an axial direction. Since the friction pads 108 are mounted in the channel 114a of the outer inertia ring 114, these axial forces are transferred to the outer inertia ring 114 via the friction pads 108. Further, since the secondary auxiliary bearings 116 are disposed in the outer annular channel 114c of the outer inertia ring 114, axial forces are transferred to the secondary auxiliary bearings 116 from facing surfaces of the outer inertia ring 114 that are defined by the outer annular channel 114c.

After the drop of the shaft 102, in time, the various frictional forces within the auxiliary bearing system 100 eventually convert the remaining rotational speeds within the auxiliary bearing system 100 to heat, thereby allowing a controlled coast down of the shaft 102. Since the primary auxiliary bearing 104 and the secondary auxiliary bearings 116 are preloaded, their durability is maximized during the transient radial and/or axial force applications associated with the drop of the shaft 102 and the subsequent deceleration of the shaft 102. Further, the acceleration rates of, and relative motions between, the components of the primary auxiliary bearing 104 and the secondary auxiliary bearings 116 are minimized through the use of multiple inertia rings, namely at least the inner inertia ring 106 and the outer inertia ring 114. Still further, the rate of energy dissipation in the friction pads 108 is reduced due to the slower acceleration of the components of the auxiliary bearing system 100 that accelerate in response to the drop of the shaft 102. Yet still further, if the primary auxiliary bearing 104 fails or is otherwise inoperable before, during or after the drop of the shaft 102, the secondary auxiliary bearings 116 are still available to allow a controlled coast down of the shaft 102 after the drop. Similarly, if the secondary auxiliary bearings 116 fail or are otherwise inoperable before, during or after the drop of the shaft 102, the primary auxiliary bearing 104 is still available to allow a controlled coast down of the shaft 102.

In several exemplary embodiments, in addition to the inner inertia ring 106 and the outer inertia ring 114, the auxiliary bearing system 100 may include one or more additional inertia rings; moreover, in addition to the primary auxiliary bearing 104 and the secondary auxiliary bearings 116, the auxiliary bearing system 100 may include one or more additional auxiliary bearings, which, in several exemplary embodiments, may be interposed with the additional inertia rings.

Figure 4:
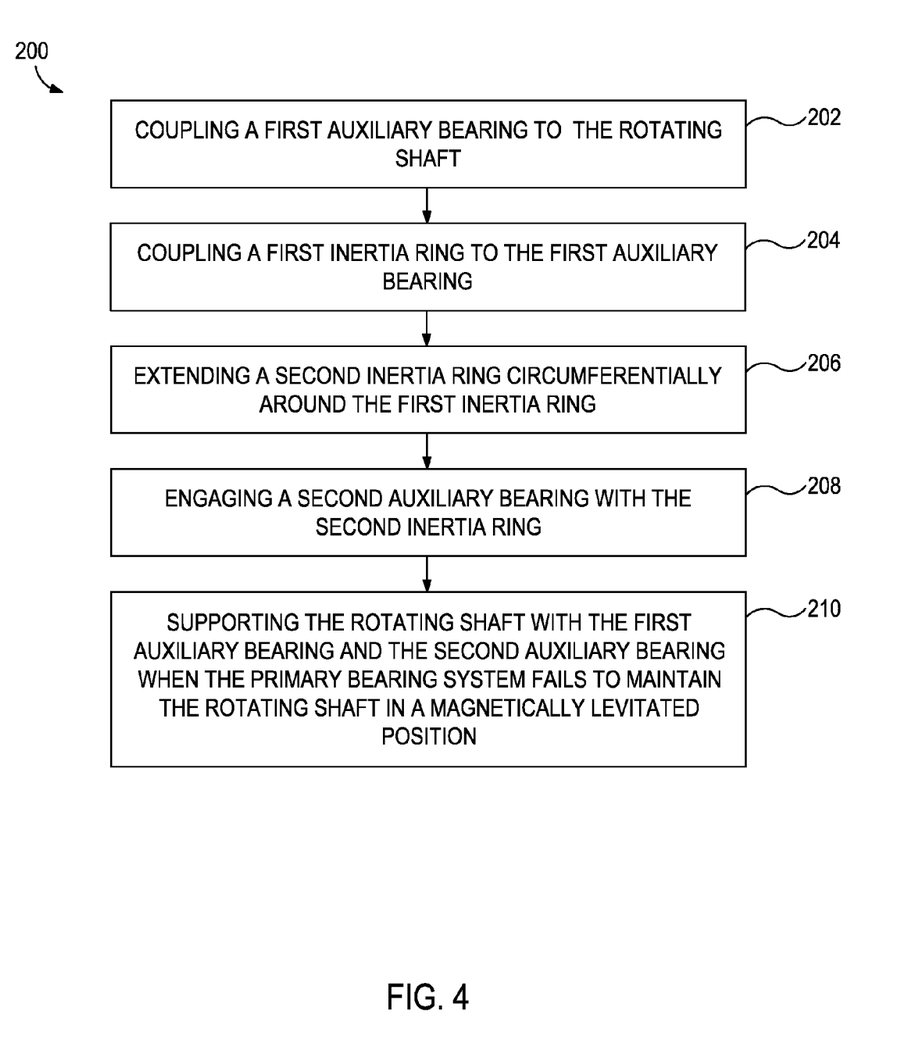
FIG. 4 is a flow chart illustration of a method of supporting a shaft, according to an exemplary embodiment.

In an exemplary embodiment, as illustrated in FIG. 4, a method is generally referred to by the reference numeral 200 and includes coupling a first auxiliary bearing to a rotating shaft, as shown at 202. The rotating shaft may be normally supported by a primary bearing system. The method 200 may also include coupling a first inertia ring to the first auxiliary bearing, as shown at 204. The method 200 may further include extending a second inertia ring circumferentially around the first inertia ring, as shown at 206. A radial clearance may be defined between the first and second inertia rings when the rotating shaft is supported by the primary bearing system, and the first inertia ring may engage the second inertia ring when the rotating shaft is not supported by the primary bearing system. The method 200 may further include engaging a second auxiliary bearing with the second inertia ring, as shown at 208. The method 200 may further include supporting the rotating shaft with the first auxiliary bearing and the second auxiliary bearing when the primary bearing system fails to maintain the rotating shaft in a magnetically levitated position, as shown at 210.

Figure 5:
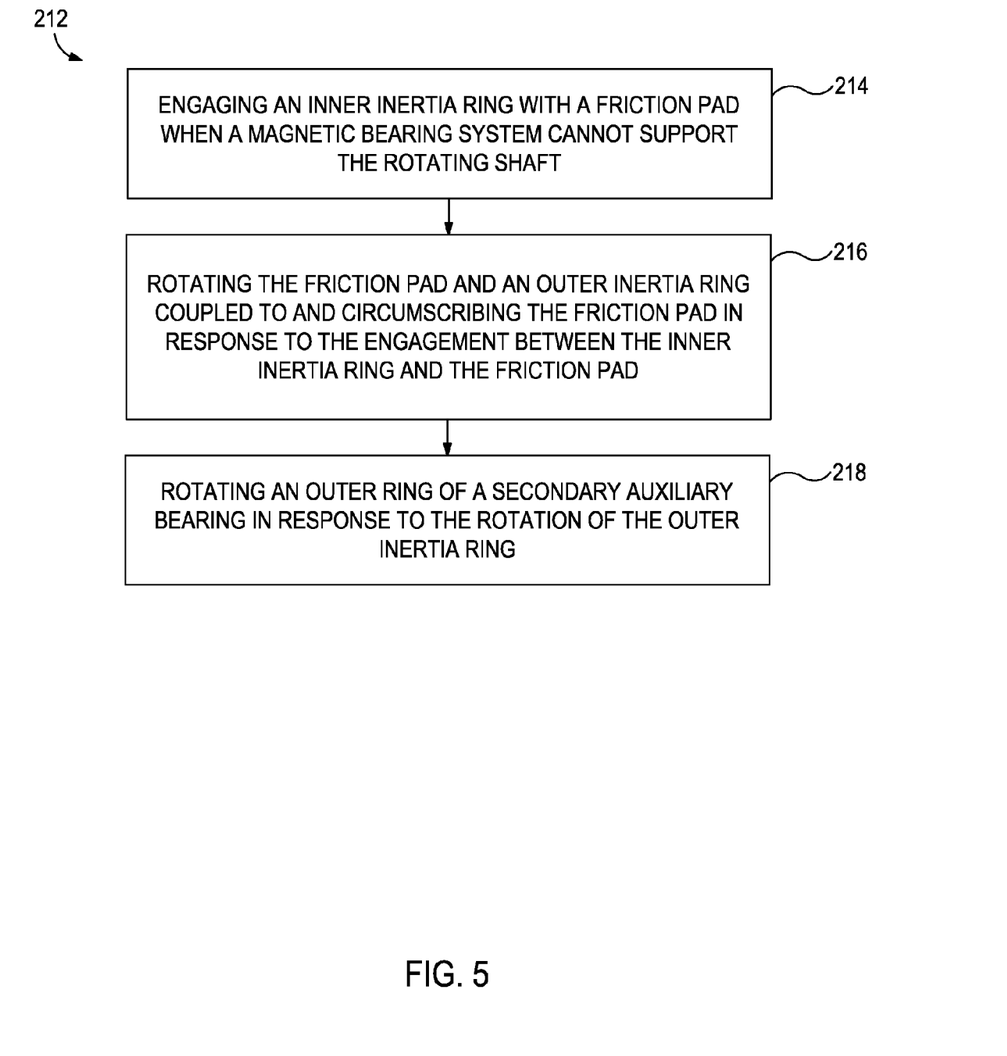
FIG. 5 is a flow chart illustration of a method of supporting a shaft of a rotor system, according to an exemplary embodiment.

In an exemplary embodiment, as illustrated in FIG. 5, a method is generally referred to by the reference numeral 212 and includes engaging an inner inertia ring with a friction pad when a magnetic bearing system cannot support the rotating shaft, as shown at 214. The inner inertia ring may be coupled to and circumscribe a first auxiliary bearing, and the first auxiliary bearing may be coupled to and circumscribe the rotating shaft. The method 212 may also include rotating the friction pad and an outer inertia ring coupled to and circumscribing the rotating shaft in response to the engagement between the inner inertia ring and the friction pad, as shown at 216. The method 212 may further include rotating an outer bearing ring of a second auxiliary bearing in response to the rotating of the outer inertia ring, as shown at 218. The outer bearing ring may be tangentially engaged with an outer surface of the outer inertia ring.

Although the present disclosure has described embodiments relating to specific turbomachinery, it is understood that the apparatus, systems and methods described herein could applied to other environments. For example, according to another exemplary embodiment, rotating machinery that is driven by a turbomachine may be configured to use embodiments of the auxiliary bearing systems described above.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An auxiliary bearing system for supporting a rotating shaft, comprising:
   a first auxiliary bearing coupled to the rotating shaft;
   a first inertia ring coupled to and circumscribing the first auxiliary bearing;
   a second inertia ring circumscribing the first inertia ring, wherein a radial clearance is defined between the first and second inertia rings when the rotating shaft is supported by a primary bearing system, and wherein the first inertia ring engages the second inertia ring when the rotating shaft is not supported by the primary bearing system; and
   a second auxiliary bearing engaged with an outer surface of the second inertia ring.

2. The auxiliary bearing system of claim 1, wherein the primary bearing system is a magnetic bearing system.

3. The auxiliary bearing system of claim 1, wherein the first auxiliary bearing comprises:
   an inner annular race coupled to the shaft;
   a plurality of rolling elements disposed circumferentially around the inner annular race; and
   an outer annular race extending circumferentially around the plurality of rolling elements.

4. The auxiliary bearing system of claim 1, wherein the second inertia ring is configured to receive a force from the first inertia ring when the primary bearing system fails to maintain the rotating shaft in a magnetically levitated position.

5. The auxiliary bearing system of claim 4, further comprising:
   at least one friction pad coupled to the second inertia ring and configured to transfer the force from the first inertia ring to the second inertia ring.

6. The auxiliary bearing system of claim 1, wherein the second auxiliary bearing comprises inner and outer concentric annular races, the outer race being rotatable in response to rotation of the second inertia ring.

7. A method for supporting a rotating shaft, comprising:
coupling a first auxiliary bearing to the rotating shaft, wherein the rotating shaft is normally supported by a primary bearing system;
coupling a first inertia ring to the first auxiliary bearing;
extending a second inertia ring circumferentially around the first inertia ring, wherein a radial clearance is defined between the first and second inertia rings when the rotating shaft is supported by the primary bearing system, and wherein the first inertia ring engages the second inertia ring when the rotating shaft is not supported by the primary bearing system;
engaging a second auxiliary bearing with the second inertia ring; and
supporting the rotating shaft with the first auxiliary bearing and the second auxiliary bearing when the primary bearing system fails to maintain the rotating shaft in a magnetically levitated position.

8. The method of claim 7, wherein the primary bearing system is a magnetic bearing system.

9. The method of claim 7, wherein the first auxiliary bearing comprises:
an inner annular race circumscribing the shaft;
a plurality of rolling elements disposed circumferentially around the inner annular race; and
an outer annular race extending circumferentially around the plurality of rolling elements.

10. The method of claim 7, wherein supporting the rotating shaft with the first auxiliary bearing and the second auxiliary bearing comprises:
transferring a force from the first inertia ring to the second inertia ring.

11. The method of claim 10, wherein transferring the force from the first inertia ring to the second inertia ring comprises:
transferring the force from the first inertia ring to the second inertia ring via at least one friction pad.

12. The method of claim 7, wherein the second auxiliary bearing comprises a rotatably supported ring; and
wherein engaging the second auxiliary bearing with the second inertia ring comprises tangentially engaging the rotatably supported ring with the second inertia ring.

13. The method of claim 12, wherein the rotatably supported ring rotates in response to rotation of the second inertia ring.

14. A rotor system, comprising:
a rotating shaft;
a magnetic bearing system positioned to support the rotating shaft during normal operation; and
an auxiliary bearing system positioned along the rotating shaft and comprising:
a first auxiliary bearing coupled to the rotating shaft;
a first inertia ring rotating with the rotating shaft during normal operation and being coupled to and circumscribing the first auxiliary bearing;
a second inertia ring circumscribing the first inertia ring and not rotating during normal operation; and
a second auxiliary bearing engaged with an outer surface of the second inertia ring, the auxiliary bearing system being configured to support the rotating shaft when the magnetic bearing system fails to support the rotating shaft.

15. The rotor system of claim 14, wherein the first auxiliary bearing comprises:
an inner annular race coupled to the rotating shaft;
a plurality of rolling elements disposed circumferentially around the inner annular race; and
an outer annular race extending circumferentially around the plurality of rolling elements.

16. The rotor system of claim 14, wherein the second auxiliary bearing comprises concentric inner and outer annular races, the outer annular race being rotatable in response to rotation of the second inertia ring.

17. The rotor system of claim 14, wherein the second inertia ring is configured to receive a force from the first inertia ring when the magnetic bearing system fails to support the rotating shaft.

18. The rotor system of claim 17, further comprising:
at least one friction pad coupled to the second inertia ring, wherein the at least one friction pad is configured to transfer the force from the first inertia ring to the second inertia ring.

19. A method for supporting a rotating shaft, comprising:
engaging an inner inertia ring with a friction pad when a magnetic bearing system cannot support the rotating shaft, the inner inertia ring being coupled to and circumscribing a first auxiliary bearing, and the first auxiliary bearing being coupled to and circumscribing the rotating shaft;
rotating the friction pad and an outer inertia ring coupled to and circumscribing the friction pad in response to the engagement between the inner inertia ring and the friction pad; and
rotating an outer bearing ring of a second auxiliary bearing in response to the rotation of the outer inertia ring, the outer bearing ring being tangentially engaged with an outer surface of the outer inertia ring.

* * * * *